United States Patent [19]

Teodorescu et al.

[11] 4,174,921
[45] Nov. 20, 1979

[54] PROCESS AND PLANT FOR THE CONTINUOUS UNLOADING OF THE HEAVY-DUTY CONTAINERS IN A PNEUMATIC TRANSPORT SYSTEM

[75] Inventors: Constantin Teodorescu; Stefan Ardeleanu, both of Bucharest, Romania

[73] Assignee: Institutul National Pentru Creatie Stiintifica Si Tehnica - Increst, Bucharest, Romania

[21] Appl. No.: 857,669

[22] Filed: Dec. 5, 1977

[30] Foreign Application Priority Data

Dec. 25, 1976 [RO] Romania ............................ 88839

[51] Int. Cl.² ............................................. B61D 7/04
[52] U.S. Cl. .............................. 414/387; 104/138 R; 104/155; 406/184
[58] Field of Search ............... 214/58, 59 R, 61, 62 R, 214/63; 243/38; 104/155, 156, 138 R; 198/704, 706

[56] References Cited

U.S. PATENT DOCUMENTS

| | | | |
|---|---|---|---|
| 1,412,869 | 4/1922 | Holstein | 214/63 |
| 2,719,636 | 10/1955 | Berg | 214/63 |
| 3,724,690 | 4/1973 | Bates | 104/155 X |

*Primary Examiner*—Robert G. Sheridan
*Attorney, Agent, or Firm*—Karl F. Ross

[57] ABSTRACT

A system for the continuous unloading of the containers of pneumatic transport vehicles to which an initial velocity is imparted by pneumatic displacement within a transport tube section, while the movement of the vehicles beyond the transport tube section is caused by inertia, the vehicle being suspended from an overhead rail.

The unloading of the vehicle container is performed by operating a latch which engages an uncoupling cam provided on the rail, thus causing the release of the container at its rear end and the pivoting of the container around its axis in the vertical plane while the container remains suspended at its front end. The emptied container is brought back to the initial position by allowing the vehicle to descend along a downward slope of the overhead rail by gravity, while the lower part of the container is lifted by riding on an upwardly inclined plane, so that the latches on the vehicle are coupled with pins provided at the tip of the container in order to hold the container in the initial load-carrying position.

6 Claims, 7 Drawing Figures

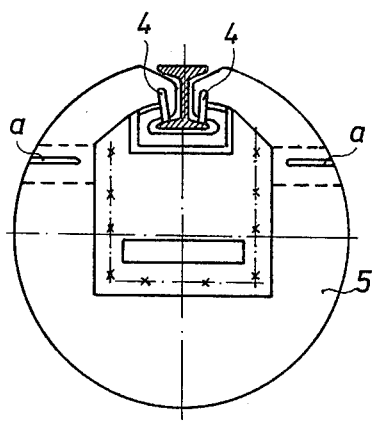 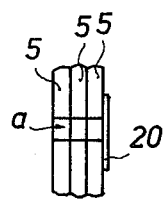 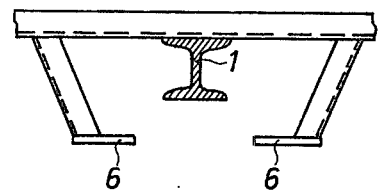
Fig. 3  Fig. 4  Fig. 5
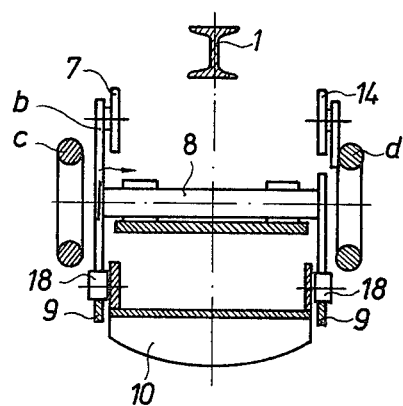 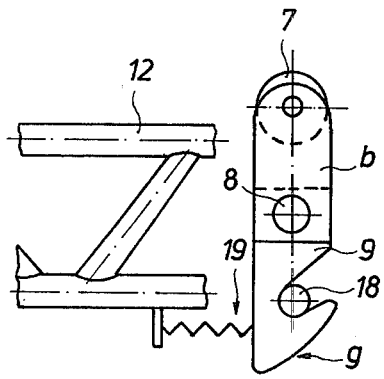
Fig. 6  Fig. 7

PROCESS AND PLANT FOR THE CONTINUOUS UNLOADING OF THE HEAVY-DUTY CONTAINERS IN A PNEUMATIC TRANSPORT SYSTEM

FIELD OF THE INVENTION

The present invention relates, in general, to a system for unloading the vehicles in a pneumatic transport system, and, more specifically, to reduce the necessary time for unloading while using an increased number of vehicles within the same period of time.

BACKGROUND OF THE INVENTION

The known methods and apparatus for unloading the vehicles of a pneumatic transport system are provided with controlling and operating devices for stopping the vehicles at a given point, unloading them by causing a rotation around the longitudinal axis of the vehicle and finally, bringing the vehicle again into the transport position.

These systems have the disadvantage of too many automation elements which have a limited endurance, while the repeated stoppings and startings of the vehicles cause an additional power consumption, thus leading to possible operating difficulties and the limitation of both the number of vehicles in continuous flow and the quantity of carried material.

OBJECTS OF THE INVENTION

It is therefore an object of the present invention to eliminate the aforesaid disadvantages. Another object of the invention is to provide a system which is able to perform the unloading of the vehicles while in motion, thus avoiding the stopping thereof, and to obtain a complete unloading of all the carried material.

SUMMARY OF THE INVENTION

These objects are accomplished by providing a system in which, during the first phase of the movement of the vehicles, an initial velocity is imparted by pneumatic propulsion within a transport tube section, while in the second phase the movement of the vehicles beyond the transport tube section is caused by the inertia of the pneumatically displaced vehicle, the vehicles being suspended from rollers which ride along an overhead rail. The unloading of the vehicle container is performed by operating a latch mounted on the vehicle by means of a fixed cam mounted on the overhead rail, thus causing the release of the container at its rear end, and the downward turning of the container around its pivot axis in the vertical plane, the container remaining suspended at its front end by the pivot while it is unloaded by dumping its contents in an unloading zone. After that, the container is brought back to the initial load-carrying position by the vehicle descending along a downwardly sloping portion of the rail due to gravitational force, while the lower part of the container is lifted by riding along an upwardly inclined plane. The latches are coupled with the pins provided on the container in order to hold the container in the initial position, this operation being performed before the container enters the transport tube by the impact force produced at the contact between the lower surface of the container and a roller placed at the downstream end fo the inclined plane.

The system according to the present invention comprises a number of transport tube sections traversed by the continuous overhead rail which is mounted on the upper part of the tubes to allow the containers to be suspended therefrom and displaced therealong. In the unloading zone, the rail is mounted outside the transport tubes on supports, and provided with two uncoupling cams symmetrically placed, one on each side of the rail. The rail may follow a gentle slope upon emerging from a transport tube section and beyond that, a steep slope in the vertical plane. Under the rail, in the section of the steep slope, there is an inclined plane ascending relative to the direction of travel of the vehicle and a closing roller placed in a passing zone located between the inclined plane and another transport tube section. The container is uncovered at its upper part and mounted by means of a pivot at its front end and two latches at its rear end, mounted on lattice girders of the frame of the vehicle.

BRIEF DESCRIPTION OF THE DRAWING

The above and other objects, features and advantages of the present invention will become more readily apparent from the following description, reference being made to the accompanying drawing in which:

FIG. 3 is a front end view of the vehicle shown in FIG. 1;

FIG. 4 is a detail of a feature of the packing seal of the transport vehicle;

FIG. 5 is a cross sectional view through the overhead rail showing the uncoupling cams;

FIG. 6 is a cross sectional view through the transport vehicle showing the latches; and FIG.7 is a side view of one of the latches.

SPECIFIC DESCRIPTION

Figure 1:
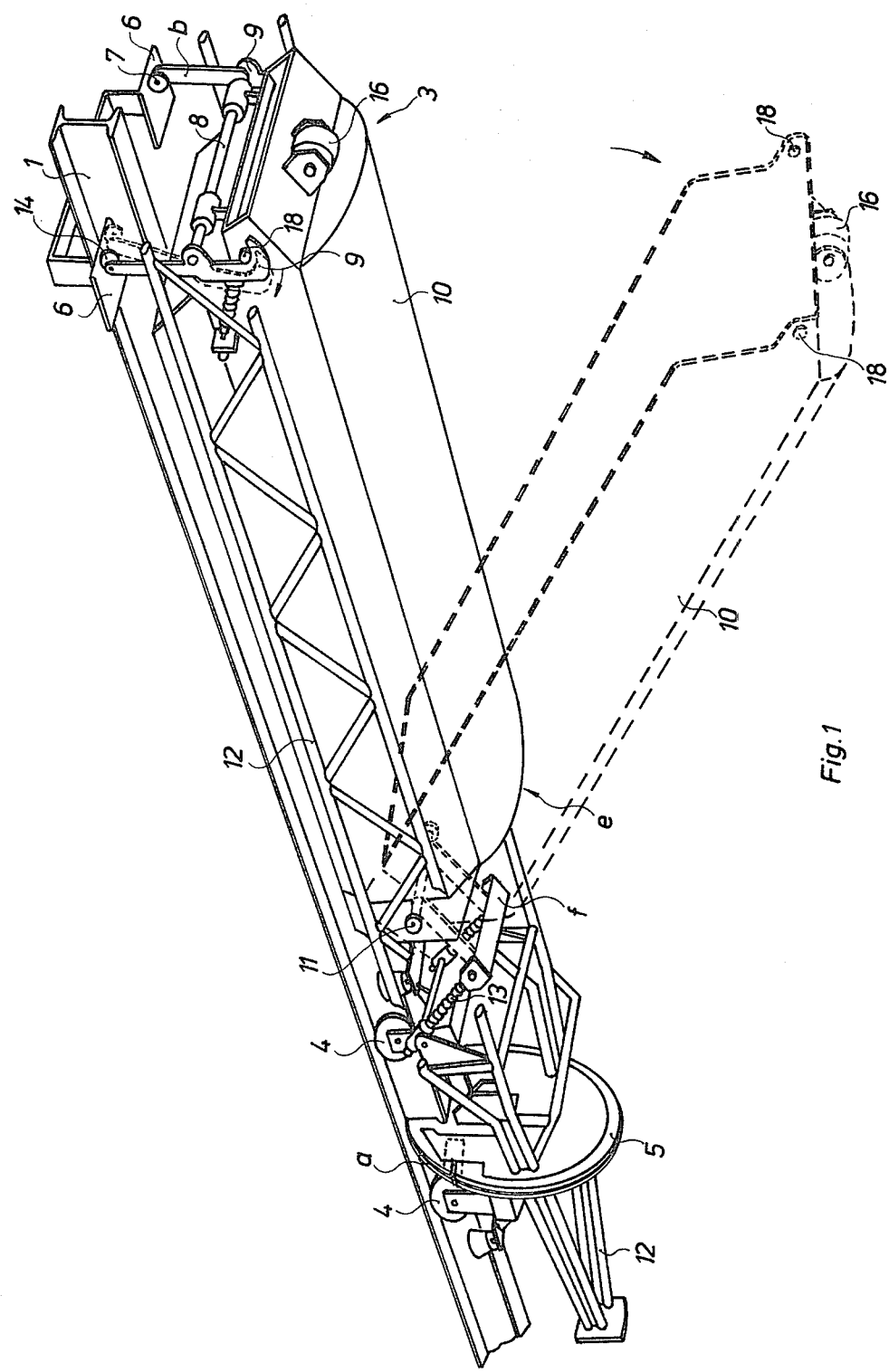
FIG. 1 is a perspective view of a vehicle of the transport system according to the invention, with parts broken away and the unloading position of the container shown in phantom lines.
Figure 2:
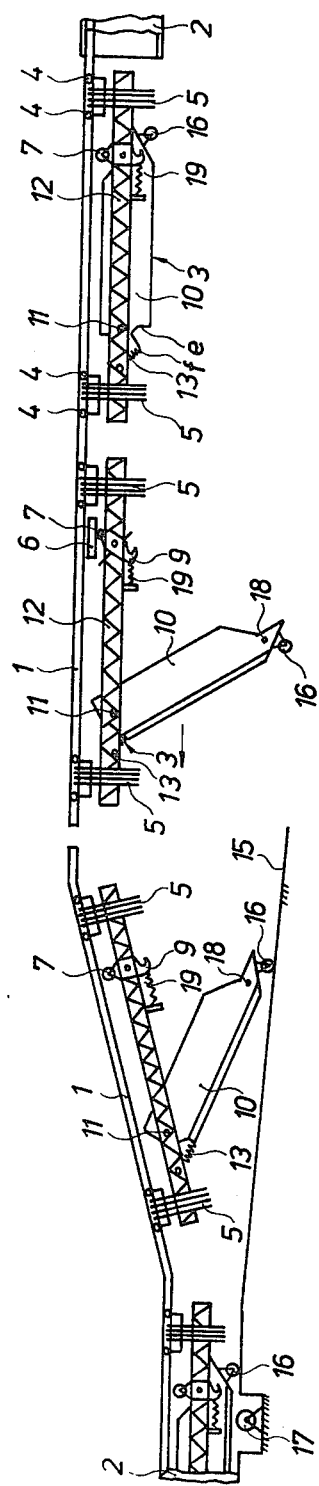
FIG. 2 is a diagrammatic elevational view of the transport system.

In accordance with the present invention, the transport system shown comprises an overhead rail 1 which has the form of an I-beam along the entire length of a transport path and which is mounted within the transport tube sections 2 along the top thereof and in the open portions of the transport path on supports (not shown). In the latter case, the rail may follow a gentle slope. A series of vehicles 3 suspended on support rollers 4 ride on the rail 1. The vehicle 3 is provided at each end with sets of packings 5.

Two uncoupling cams 6, each symmetrically on either side of the rail 1, are placed above a zone at a point where the unloading of the container 3 is to be performed. Each of the cams 6 passes through a slotted hole a cut in the packings 5. One of the uncoupling cams 6 comes into contact with a roller 7 mounted on an arm b fixed on an axle 8, which forms a part of the latching mechanism at the rear end of the container 3. The axle 8 has a latch 9 fixed at each end to rotate both latches 9 at the same time, thus uncoupling the container 10 which is uncovered at its upper part and loaded with the carried material.

The container 10 with its load turns downwardly at its front end around a pivot 11, due to the gravitational force when the container 10 is released. The pivot 11 is fastened on the frame 12 of the vehicle 3. The frame 12 consists of two lattice girders c and d placed laterally on both sides of the container 10.

At least one concussion spring 13 is mounted on the frame 12 placed at the front part of the container 10. The concussion spring 13 damps the shock produced by the gravitational fall of the container. After the container 10 leaves the initial horizontal position, it pivots downwardly to almost a vertical position, where it comes in contact at its front end e, with a plate f of the concussion spring 13.

Although the vehicle 3 may be driven in a movement of balance while the roller 7 is actuated by one of the uncoupling cams 6, a movement which may prevent the uncoupling of the container 10, such as side-to-side rocking of the vehicle 3 might occur, so that the vehicle 3 is provided with a counterbalance roller 14, which is mounted on the lattice girder d of the frame 12 and placed symmetrically relative to the roller 7 with respect to the vertical plane, which crosses the longitudinal axis of the vehicle. When the roller 7 comes into contact with one of the uncoupling cams 6, the counterbalance roller 14 comes into contact with the other uncoupling cam 6 as well, thus preventing any rocking motion of the vehicle at that point and ensuring the uncoupling of container 10.

In order to automatically pivot the container 10 upwardly to the initial position, the rail 1 assumes a steep slope in the vertical plane, while under the rail 1, an inclined plane 15 ascends relative to the direction of movement of the vehicle 3. The container is provided at the rear end with a wheel 16 which rides along the inclined plane 15.

In the passing zone located between the inclined plane 15 and a transport tube section 2 there is a closing roller 17 which projects slightly above the surface of the passing zone to ensure the coupling of the container 10 and the latches 9. The closing roller 17 gives a final push to the container 10 upwards around the pivot 11 in such a way so that the lifting of the rear part of the container 10 causes the pins 18, mounted laterally on the container 10, to come into contact with a rpofiled portion g of the latches 9, to deflect these latches in a rotatige motion around the axle 8 and to compress the springs 19. After these successive movements, the container 10 reaches the respective, closed position and, at the same time, the latches 9, under the action of the springs 19, locks the container 10 in position.

In order to limit the air leakage through the slots a, the sets of packings 5 are provided at each slot with an overlying flexible membrane 20 which allows the passing of the uncoupling cams 6, but ensuring the air tightness of the slots within the transport tube sections 2.

The operation of the system, according to the invention, takes palce as follows:

The container 3, provided with the packings 5 and having the container 10 coupled by means of the pins 18 and latches 9, runs inside a transport tube section 2 due to the pressure difference produced by means of exhaustors.

The vehicle 3 runs on the rail 1 by means of the support rollers 4. Coming out of a transport tube section 2, it enters an unloading zone where the unloading operation takes place. When the uncoupling cams 6 come into contact with the roller 7 and with the counterbalance roller 14, respectively, the latches 9 pivot around the axle 8, the pins 18 are released and the rear end of the container 10 rotates downwardly around the pivot 11. Due to this rotative motion a centrifugal force is exerted upon each particle of the loaded material in addition to the force exerted by its own weight. Thus, when the container 10 drops to the unloading position, the total force of the detachment of the material from the container reaches a value that is approximately equal to three times its own weight. This allows the self-unloading of materials which present a high degree of adherence of the inner surface of the container 10. As the unloading operation is performed while the vehicle is in motion, the container 10 comes into contact with the concussion spring 13 which damps the shock produced by the fall of the container 10 from the frame 12. Due to a combination of inertia and gravitational force, the vehicle 3 with the container 10 in the unloading position continues to run on the rail 1 beyond the respective unloading zone until the wheel 16 comes into contact with the inclined plane 15. Here, a more abrupt descent of the rail 1 causes the container 10 to pivot up to the initial position.

At the end of a transport cycle, the container 10 is held tightly in position by the latches 9. The latches 9 catch the pins 18 due to the upward push applied by the closing roller 17 on the lower surface of the container 10, and the vehicle 3, unloaded, enters another transport tube section 2 wherein it runs towards one of the loading stations displaced by pneumatic propulsion.

The system according to the invention, presents the following advantages:

It allows the unloading of the vehicles while in motion, thus eliminating the devices for stopping the vehicles at a given point.

It allows the increasing of the amount of carried loads by using an increased number of vehicles within a very short interval of time, approximately some seconds.

It allows the complete unloading of materials which have a high adherence to the inner walls of the container, due to the centrifugal force exerted upon the carried material during the unloading operation.

We claim:

1. A pneumatic transport system comprising:
   a transport path defined by spaced tube sections traversed by a continuous overhead rail;
   a surface provided below said rail at an unloading zone between tube sections of said path and approaching the rail in the direction of transport;
   cam means on said rail in said zone and upstream of said surface; and
   at least one transport vehicle pneumatically displaceable along said rail through said tube sections, said transport vehicle comprising:
      an elongated frame,
      a plurality of support rollers at each end of said frame and engaging said rail,
      a packing seal at each end of said frame effective in said sections for the pneumatic displacement of the vehicle,
      an elongated container pivotally mounted at one of its ends on said frame,
      latch means on said frame and engaging the other end of said container for holding said container in a load-carrying position generally parallel to said rail, said latch means being engageable by said cam means when said vehicle is displaced along said rail for releasing said container to enable the pivoting thereof by gravity into a downwardly sloping unloading position, and
      a wheel provided at said other end of said container riding along said surface when said container is in the unloading position for pivoting said container upwardly toward the load-carrying position.

2. The system defined in claim 1 wherein said container is pivotally mounted at a forward end thereof relative to the direction of travel.

3. The system defined in claim 1 wherein said cam means comprises a pair of horizontal plates flanking said rail and said packing seals are formed with horizontal slots in the outer edges thereof for the passage of said plates therethrough, each of said slots being provided with a flexible membrane on the high pressure side thereof for preventing pneumatic leakage through said slots.

4. The system defined in claim 1, further comprising a closing roller downstream of said surface and projecting slightly thereabove for engagement with said wheel of biasing said container into engagement with said latch means.

5. The system defined in claim 1, further comprising spring means on said frame adjacent the forward end of said container and engageable therewith in the unloading position for damping of shocks to said frame produced by said container.

6. The system defined in claim 1, further comprising spring means on said frame for biasing said latch means into engagement with said container.

* * * * *